United States Patent [19]

Schaeffer

[11] 4,128,939
[45] Dec. 12, 1978

[54] PEELING CUTTER

[75] Inventor: Robert L. Schaeffer, Leroy, N.Y.

[73] Assignee: General Electric Company, Bridgeport, Conn.

[21] Appl. No.: 786,649

[22] Filed: Apr. 11, 1977

[51] Int. Cl.² .............................................. B26B 1/00
[52] U.S. Cl. ........................................ 30/123; 30/276; 30/287
[58] Field of Search ................. 30/276, 286, 287, 289, 30/123, 123.5, 123.6, 500; 99/593

[56] References Cited

U.S. PATENT DOCUMENTS

| 1,830,813 | 11/1931 | Tautz | 30/276 |
|---|---|---|---|
| 3,026,672 | 3/1962 | Szczepanski | 30/276 |
| 3,195,594 | 7/1965 | Bloomquist et al. | 30/276 |
| 3,292,679 | 12/1966 | Roth | 30/287 |

FOREIGN PATENT DOCUMENTS

| 505515 | 5/1939 | United Kingdom | 30/123.5 |
|---|---|---|---|
| 524799 | 8/1940 | United Kingdom | 30/276 |

Primary Examiner—Robert C. Watson
Attorney, Agent, or Firm—John F. Cullen; George R. Powers; Leonard J. Platt

[57] ABSTRACT

A cutter construction for a vegetable peeler that has a cylindrically electrically rotatable body with a longitudinal mounting shaft and a plurality of longitudinally extending slots coextensive with and equally spaced around the body and a cutter blade disposed lengthwise from the body outer end to the inner end in each slot. In this general arrangement an improved slot and blade configuration is provided wherein each blade is disposed in its own slot with its entire cutting edge angled or slanted in the direction of rotation and with a high point in an operable permissible range above the body periphery a maximum of 0.030 inches (0.75 mm) and a minimum of 0.008 inches (0.20 mm). A clearance recess is provided below and coextensive with each blade and extending substantially at right angles to the blades in the direction of rotation. It has a peripheral width from substantially 0 inches to 0.180 inches (4.5 mm). Thus, the width of the recess varies inversely with the blade height within the range so that clogging of peelings and cutting of the user's skin is at a minimum. A preferred specific range is defined and the cylindrical peeler may have a flared end shield on the inner end to guide peelings away from the shaft and the recesses and the peeler may have a spaced knob on the outer end for removing the shaft and cutter without contacting the knife surfaces on the cutter.

4 Claims, 5 Drawing Figures

PEELING CUTTER

BACKGROUND OF THE INVENTION

1. Field of the Invention

The invention relates to an electric vegetable peeler construction having specifically disposed and sized blade and recess structure with a relation of an inverse ratio between the two so that peelings may be easily removed from substantially all vegetables and fruits while providing a construction that keeps any cutting of the user's skin to a minimum if at all.

2. Description of the Prior Art

Motorized and powered vegetable peelers and other scrapers as well as individual cutter construction are all well known. Most of the peelers involve a detached motor that is cord connected to an electrically rotatable body carrying a cutter of various types to be pressed against a hard vegetable for peeling. Such a device is shown in U.S. Pat. No. 3,026,612. Also widely differing cutters per se may be used for numerous applications such as cutting grooves in wood, peeling plywood layers, and general purpose applications such as shown in U.S. Pat. No. 1,830,813, and these comprise equally spaced blades around a central locating body with the blade performing its specific operation. Such cutters are not selective and they will cut wood, metal, plastic, and fingers with equal ease and often clog readily on soft, sticky items like vegetables and fruits.

SUMMARY OF THE INVENTION

Briefly, described, there is provided a cutter construction for a vegetable peeler with a cylindrically and electrically rotatable body having a longitudinal mounting shaft and a plurality of longitudinally extending slots coextensive with and equally spaced around the body with a cutter blade disposed lengthwise from the body outer end to its inner end in each slot. To this general arrangement there is provided an improved slot and blade connection that includes each of the blades being disposed in its own slot with its entire cutting edge slanted or angled in the direction of rotation and having a height above the body periphery falling within the range varying from a maximum of 0.030 inches (0.75 mm) inwardly to a minimum of 0.008 inches (0.20 mm). A clearance recess is provided below and coextensive with each of the blades and the recess extends substantially at a right angle to its individual blade in the direction of rotation. The recess for each blade has a peripheral width in the range of 0 to 0.180 inches (4.5 mm) with the width varying inversely with the blade height. This prevents clogging of the peelings in use with vegetables and, more importantly, any cutting of the user's skin is held in a minimum. A preferred blade height to recess width is disclosed and modifications to each end of the rotatable body are provided with a flared end shield at the inner end of the body to guide peelings away from the shaft and the recesses and with a spaced knob on the outer end of the body so the shaft or cutter can be pulled out of the driving mechanism without the user contacting the body peripheral surface and the cutters. Thus, the main object is to provide a cutter construction for a vegetable peeler which cutter is so formed and sized so that it is selective in that it will cut the skin on a wide variety of fruit and vegetables and shed the peelings without clogging and, at the same time, provide a structure that is formed not to cut the skin on the user.

DESCRIPTION OF THE PREFERRED EMBODIMENT

Figure 1:
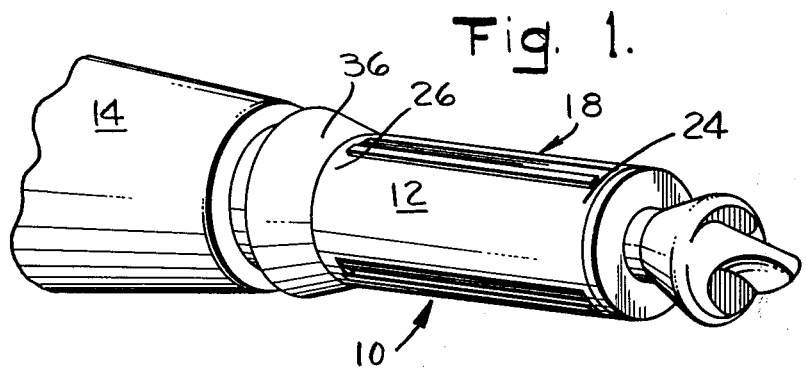
FIG. 1 is a partial perspective showing the cutter mechanism attached to a handle driving means.

Referring first to FIG. 1, a cutter mechanism generally shown at 10 is provided for a vegetable peeler and is made of a cylindrically rotatable body 12 and preferably formed of any suitable plastic such as acetal and may be conveniently supported and driven from a power handle 14 as in an electric toothbrush. It rotates body 12 by connecting with a longitudinal mounting shaft 16 which may be snapped into the handle 14 much like the beaters on a mixer. For cutting, individual cutter blade assemblies 18 of longitudinally extending slots 20 and blades 22 are equally spaced around the periphery of body 12.

Figure 2:
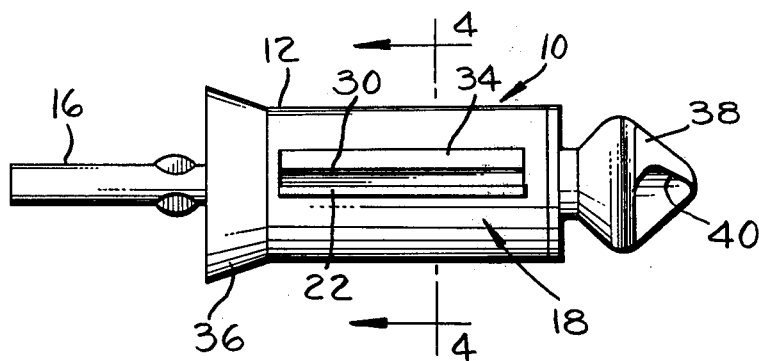
FIG. 2 is a side elevation of the cutter mechanism of FIG. 1.
Figure 3:
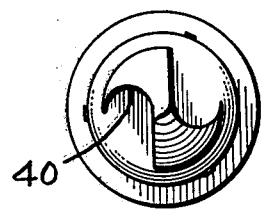
FIG. 3 is an end view of the eye coring mechanism at one end of the cutter.
Figure 4:
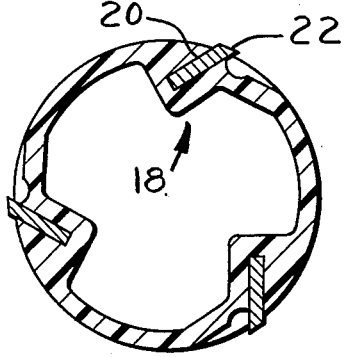
FIG. 4 is a cross-sectional view of the cutter taken on line 4—4 of FIG. 2.

Cutters of this general type are not new and have been used for a number of years for mills, wood jointers, and even peelers. However, such cutters are not at all selective. They will cut wood, metal, plastic, and fingers with equal ease. Frequently they clog readily on soft, sticky items like vegetables and fruits. It is desired to provide a cutter that is selective to be used in a hand held powered fruit and vegetable peeler to cut the skin on a wide variety of fruit and vegetables without cutting the user's skin. One of the problems with the standard cutters is peelings clogging the clearance undercut adjacent the blades since potato and peach peels tend to be sticky and when the undercuts fill the cutter will not peel. The problem of a selective cutter is further complicated by the fact that it is necessary to peel not only hard vegetables like carrots and potatoes with a firm body and soft fragile skins but also materials such as cucumbers and tomatoes and apples and peaches which have tough skins but soft pulpy bodies. For example, cutting a cucumber with a thick fairly tough skin and a pulpy body is close to a human finger in terms of a selective cutter whereas a ripe tomato with very thin tough skin and very soft body requires a very sharp cutter blade to peel satisfactorily. Thus, it is necessary to develop a specific cutter structure configuration that peels fruits and vegetables of different consistencies satisfactorily but still minimizes the risk of cutting the user's skin. To this end, each cutter blade assembly 18 comprises longitudinally extending slots 20 that are coextensive with and equally spaced around body 12 and containing an individual cutter blade 22 with one blade to each slot and disposed lengthwise from the body outer end 24 to its inner end 26. In other words, each blade and slot extends longitudinally along the entire body surface as seen in FIGS. 1 and 2. Three equally spaced cutter assemblies 18 are shown in FIG. 4, although any suitable number may be used and the individual assembly is shown enlarged in FIG. 5 and will be so described.

Figure 5:
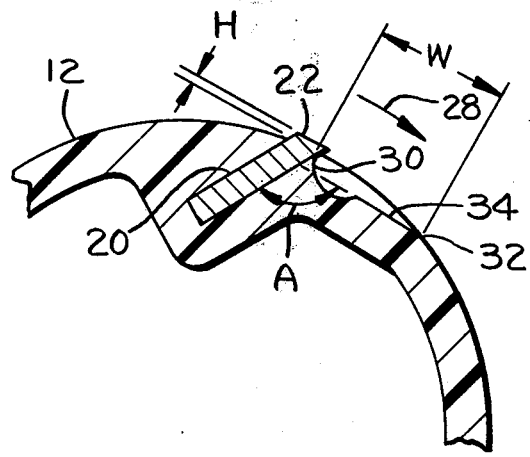
FIG. 5 is an enlarged partial sectional of an individual cutter blade as shown in FIG. 4.

To provide proper cutting within the requirements of handling a great variety of differing vegetables without cutting the user's skin, a selective blade construction is necessary to meet these requirements and in FIG. 5, there is shown an improved slot and blade configuration that is selective for the requirements above. In this selective configuration, each blade 22 is disposed in its slot 20 by merely forcing or pushing the blade into the slot formed in the plastic body. The force of cutting will seat the blade properly and keep it in position and it is merely necessary to push it into the slot 20 to hold it. For proper cutting, the entire cutting edge is angled or slanted in the direction of rotation as shown by arrow 28 and is disposed in the body wherein the blade height H above the peripheral surface of body 12 is preferably 0.013±0.002 inches (0.325±0.050 mm) as a desirable configuration. Axially the height may vary between a maximum of 0.030 inches (0.75 mm) and a minimum of 0.008 inches (0.20 mm) and any blade height within this selective range is adequate to meet the requirements although the 0.013 inches is the preferred height. Thus, blade heights in the range will satisfactorily cut the varying vegetable and fruit consistencies while minimizing the risk of cutting the user's skin. Also, in order to properly clear the blade and prevent material from clogging the cutters, it is necessary to provide a specifically formed clearance recess 30 that is disposed below the body surface and is coextensive with each blade throughout its length as shown in FIGS. 5 and 2 respectively. Recesses per se are known but are not of the specific configuration herein. In this respect, the recess extends away substantially at a right angle A to the blade as shown in FIG. 5 and the recess is aimed in the direction of rotation i.e. extending out to come flush to the surface of cylindrical body 12 at 32 as opposed to a mere undercut in the vicinity of numeral 30 in FIG. 5. In other words, it is necessary for the recess to extend a distance in the direction of rotation to provide the flat surface 34 as shown. The shape of this undercut recess with its flat surface extending substantially at right angles to the blade 22 controls against the tendency to clog as well as the tendency to cut the user's skin. Within the range of the blade height, the recess must vary inversely so that as the height H is decreased, the recess widens out or increases through a range varying from substantially O width W at the maximum height of 0.030 inches (0.75 mm) out to a preferred width as shown in FIG. 5 of 0.180±0.005 inches (4.5±0.125 mm). Any blade height H and recess width W within these ranges will meet the parameters required of cutting a wide variety of vegetables and fruits satisfactorily without nicking the user's skin and the relationship is that as the blade height is decreased the recess is increased within the ranges noted to provide a ramp for clearing the length. Even with the optimum relationship between blade height and clearance of 0.013 and 0.180 inches respectively, it is still possible to skin a knuckle if the skin is tight over the bone but on the palm or inside finger there is flesh under the skin, and the risk of cutting with a cutter of this relationship is minimal. But even if the cutter should nick a finger it tends to be a surface abrasion rather than a deep cut such as a knife can make.

In order to guide the peeling away from the mounting or recesses holding shaft 16, a flared end shield 36 is provided on the inner end of the cylindrical body 12 so that no jamming of the mounting can take place.

Having designed the cutter to meet a wide variety of requirements without cutting the user's skin, it is also necessary to provide a convenient means of removing the cutter when it is stopped without slicing the fingers as the cutter mechanism 10 is grasped by the hand. For this, there is provided an additional spaced knob 38 that is also formed of plastic and suitably mounted on the outer end of body 12 by which the cutter may be pulled out of power handle 14. This knob 14 may also be formed with suitable plastic relatively safe cutters 40 that may be used for eyeing potatoes or damaged portions of fruits and vegetables thus serving a dual purpose of a removal means as well as an auxiliary cutter. This is then used for removing the shaft and cutter of body 12 thus avoiding the sharp cutter blades 22.

Thus, the invention provides a specifically formed peeling cutter for use with a self-powered handle or shaft mount which cutter structure has a relationship between blade height and formation and extent of a cutting recess by which a wide variety of soft and hard fruits and vegetables can be actually peeled while more importantly, minimizing the risk of cutting the user's skin. Actually a cutter of this nature may be placed flat on the user's palm without cutting the skin at all.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A cutter mechanism for a vegetable peeler having a cylindrically electrically rotatable body with a longitudinal mounting shaft and a plurality of longitudinally extending slots coextensive with and equally spaced around the body with a cutter blade disposed lengthwise from the body outer to inner end in each slot, an improved slot and blade configuration comprising, each blade disposed in its slot with its entire cutting edge angled in the direction of rotation and with a height above the body peripheral surface a maximum of 0.030 inches (0.75 mm) and a minimum of 0.008 inches (0.20 mm), a clearance recess below and coextensive with each blade and extending substantially at a right angle to the blade in the direction of rotation with a peripheral width from substantially 0 to 0.180 inches (4.5 mm) respectively, the width varying inversely with blade height so clogging of peelings and cutting of the user's skin is a minimum.

2. Apparatus as described in claim 1 wherein the blade height is 0.013±0.002 inches (0.325±0.050 mm) and the recess width is 0.180±0.005 inches (4.5±0.125 mm).

3. A cutter mechanism for a vegetable peeler having a cylindrically electrically rotatable body with a longitudinal mounting shaft and a plurality of longitudinally extending slots coextensive with and equally spaced around the body with a cutter blade disposed lengthwise from the body outer to inner end in each slot, an improved slot and blade configuration comprising, each blade disposed in its slot with its entire cutting edge angled in the direction of rotation and with a height above the body peripheral surface of maximum of 0.030 inches (0.75 mm) and a minimum of 0.008 inches (0.20 mm), a clearance recess below and coextensive with each blade and extending substantially at a right angle to the blade in the direction of rotation with a peripheral width from substantially 0 to 0.180 inches (4.5 mm) respectively, the width varying inversely with blade height, and having a flared end shield on said inner end of the cylindrical body to guide peelings away from said shaft and recesses.

4. Apparatus as described in claim 3 having a spaced knob on the body outer end for removing the shaft and cutter without contacting said body peripheral surface.

* * * * *